(12) United States Patent  
Hirai et al.

(10) Patent No.: US 11,938,740 B2  
(45) Date of Patent: Mar. 26, 2024

(54) LIQUID EJECTING DEVICE AND METHOD OF CONTROLLING LIQUID EJECTING DEVICE

(71) Applicant: SEIKO EPSON CORPORATION, Tokyo (JP)

(72) Inventors: Yasuaki Hirai, Shiojiri (JP); Masayuki Ishida, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 121 days.

(21) Appl. No.: 17/807,988

(22) Filed: Jun. 21, 2022

(65) Prior Publication Data

US 2022/0402276 A1 Dec. 22, 2022

(30) Foreign Application Priority Data

Jun. 22, 2021 (JP) ................ 2021-103039

(51) Int. Cl.
*B41J 2/175* (2006.01)
(52) U.S. Cl.
CPC ................ *B41J 2/17566* (2013.01)
(58) Field of Classification Search
CPC .......... B41J 2/17566; H04N 1/00832
See application file for complete search history.

(56) References Cited

U.S. PATENT DOCUMENTS

2002/0073002 A1* 6/2002 Horii ............ G06Q 20/102
  705/29
2009/0234762 A1 9/2009 Kondo

FOREIGN PATENT DOCUMENTS

| JP | 2002036582 A | 2/2002 |
| JP | 2002067451 A | 3/2002 |
| JP | 2009223059 A | 10/2009 |

* cited by examiner

*Primary Examiner* — Bradley W Thies
(74) *Attorney, Agent, or Firm* — CHIP LAW GROUP

(57) ABSTRACT

A liquid ejecting device includes a liquid ejecting head configured to eject a liquid to a medium to perform printing, and a control unit configured to control the liquid ejecting head and include a storage unit. The storage unit is configured to be able to store a plurality of ranges of the liquid consumption amount, and the number of printed sheets on which, in a predetermined period, printing is performed in each of the plurality of ranges of the liquid consumption amount. When the plurality of ranges of the liquid consumption amount are changed within the predetermined period, the control unit performs invalidation processing on the number of printed sheets stored in the storage unit.

8 Claims, 9 Drawing Sheets

| AT THE TIME OF CONTRACT | 31 | CD | |
|---|---|---|---|
| REGION | RANGE | NUMBER OF PRINTED SHEETS | FEE PER SHEET (YEN) |
| Low | ~5.0% | 0 | 5 |
| Mid | 5.1~10.0% | 0 | 10 |
| High | 10.1%~ | 0 | 20 |

A-TH DAY AFTER CONTRACT HAS BEEN MADE → RANGES ARE CHANGED  31  CD

| REGION | RANGE | NUMBER OF PRINTED SHEETS | FEE PER SHEET (YEN) |
|---|---|---|---|
| Low | ~1.0% | 10 | 5 |
| Mid | 1.1~2.0% | 0 | 10 |
| High | 2.1%~ | 0 | 20 |

FIG. 5

B DAYS BEFORE PAYMENT OF FEE  31  CD

| REGION | RANGE | NUMBER OF PRINTED SHEETS | FEE PER SHEET (YEN) |
|---|---|---|---|
| Low | ~1.0% | 30 | 5 |
| Mid | 1.1~2.0% | 50 | 10 |
| High | 2.1%~ | 200 | 20 |

FIG. 6

B DAYS BEFORE PAYMENT OF FEE → CHANGE IS MADE TO GET RANGE BACK TO RANGE AT THE TIME OF CONTRACT  31  CD

| REGION | RANGE | NUMBER OF PRINTED SHEETS | FEE PER SHEET (YEN) |
|---|---|---|---|
| Low | ~5.0% | 30 | 5 |
| Mid | 5.1~10.0% | 50 | 10 |
| High | 10.1%~ | 200 | 20 |

FIG. 7

AT THE TIME OF PAYMENT OF FEE  31  CD

| REGION | RANGE | NUMBER OF PRINTED SHEETS | FEE PER SHEET (YEN) |
|---|---|---|---|
| Low | ~5.0% | 50 | 5 |
| Mid | 5.1~10.0% | 50 | 10 |
| High | 10.1%~ | 200 | 20 |

FIG. 8

A-TH DAY AFTER CONTRACT HAS BEEN MADE → RANGES ARE CHANGED 31 CD

| REGION | RANGE | NUMBER OF PRINTED SHEETS | FEE PER SHEET (YEN) |
|---|---|---|---|
| Low | ~1.0% | 0 | 5 |
| Mid | 1.1~2.0% | 0 | 10 |
| High | 2.1%~ | 0 | 20 |

FIG. 9

B DAYS BEFORE PAYMENT OF FEE 31 CD

| REGION | RANGE | NUMBER OF PRINTED SHEETS | FEE PER SHEET (YEN) |
|---|---|---|---|
| Low | ~1.0% | 20 | 5 |
| Mid | 1.1~2.0% | 50 | 10 |
| High | 2.1%~ | 200 | 20 |

FIG. 10

B DAYS BEFORE PAYMENT OF FEE → CHANGE IS MADE TO GET RANGE BACK TO RANGE AT THE TIME OF CONTRACT 31 CD

| REGION | RANGE | NUMBER OF PRINTED SHEETS | FEE PER SHEET (YEN) |
|---|---|---|---|
| Low | ~5.0% | 0 | 5 |
| Mid | 5.1~10.0% | 0 | 10 |
| High | 10.1%~ | 0 | 20 |

FIG. 11

AT THE TIME OF PAYMENT OF FEE 31 CD

| REGION | RANGE | NUMBER OF PRINTED SHEETS | FEE PER SHEET (YEN) |
|---|---|---|---|
| Low | ~5.0% | 20 | 5 |
| Mid | 5.1~10.0% | 0 | 10 |
| High | 10.1%~ | 0 | 20 |

<USAGE HISTORY INFORMATION>   DATE OF CONTRACT: JUNE 1, 2021

[BEFORE FIRST CHANGE]   DATE OF CHANGE: JUNE 3, 2021

| REGION | RANGE | NUMBER OF PRINTED SHEETS |
|---|---|---|
| Low | ~5.0% | 10 |
| Mid | 5.1~10.0% | 0 |
| High | 10.1%~ | 0 |

[BEFORE SECOND CHANGE]   DATE OF CHANGE: JUNE 28, 2021

| REGION | RANGE | NUMBER OF PRINTED SHEETS |
|---|---|---|
| Low | ~1.0% | 20 |
| Mid | 1.1~2.0% | 50 |
| High | 2.1%~ | 200 |

[AFTER SECOND CHANGE]   DATE OF CHANGE: JUNE 28, 2021

| REGION | RANGE | NUMBER OF PRINTED SHEETS |
|---|---|---|
| Low | ~5.0% | 20 |
| Mid | 5.1~10.0% | 0 |
| High | 10.1%~ | 0 |

LIQUID EJECTING DEVICE AND METHOD OF CONTROLLING LIQUID EJECTING DEVICE

The present application is based on, and claims priority from JP Application Serial Number 2021-103039, filed on Jun. 22, 2021, the disclosure of which is hereby incorporated by reference herein in its entirety.

BACKGROUND

1. Technical Field

The present disclosure relates to a liquid ejecting device that includes a liquid ejecting head configured to eject a liquid to a medium such as a sheet, and also relates to a method of controlling the liquid ejecting device.

2. Related Art

As this type of liquid ejecting device, an ink jet-type printer has been widely known. In the printer, a liquid ejecting head is configured to eject a liquid such as ink to perform printing on a medium such as a sheet. For example, JP-A-2002-36582 discloses a charging system in which charging is performed in accordance with the substantial amount of ink used in a liquid ejecting device such as a printer. In this charging system, charged fees are determined on the basis of the price schedule applied to a user and the amount of ink used.

However, in a case of the charging system described in JP-A-2002-36582 described above, charge management information may be changed from the contract details for a certain reason including an error occurring at the time of writing or an error resulting from noise or the like. In addition, a mistake may happen such that the charge management information is accidentally changed at the time when an agency that charges for the liquid ejecting device accesses the charge management information.

When the charge management information becomes information differing from the contract details due to such an error or mistake, there is a possibility that the amount of charge to be paid by a user (customer) who leases the liquid ejecting device differs from the fee based on the contract details.

In this case, when the charged amount increases as a result of an error in the charge management information, the user suffers a disadvantage. A disadvantage to the user resulting from such an unexpected event should be avoided. However, it is difficult to expect that the charge management information changes due to an error or the like. Thus, there has been a demand for a technique that can suppress occurrence of a disadvantage to a user even when the charge management information changes due to an unexpected event.

SUMMARY

A liquid ejecting device that solves the problem described above includes a liquid ejecting head configured to eject a liquid to a medium to perform printing, and a control unit configured to control the liquid ejecting head and include a storage unit, in which the storage unit is configured to store a plurality of ranges of a liquid consumption amount, and a number of printed sheets on which, in a predetermined period, printing is performed in each of the plurality of ranges of the liquid consumption amount, and when the plurality of ranges of the liquid consumption amount are changed within the predetermined period, the control unit performs invalidation processing on the number of the printed sheets stored in the storage unit.

A method of controlling a liquid ejecting device, which solves the problem described above, is a method of controlling a liquid ejecting device including a liquid ejecting head configured to eject a liquid to a medium to perform printing, the liquid ejecting device being configured to store a plurality of ranges of a liquid consumption amount and a number of printed sheets on which, in a predetermined period, printing is performed in each of the plurality of ranges of the liquid consumption amount, the method including determining whether or not the plurality of ranges of the liquid consumption amount is changed within the predetermined period, and when the plurality of ranges of the liquid consumption amount are changed within the predetermined period, performing invalidation processing on the stored number of the printed sheets.

BRIEF DESCRIPTION OF THE DRAWINGS

FIG. 5 is a schematic view illustrating a transition of charge management information according to a comparative example.

FIG. 6 is a schematic view illustrating a transition of charge management information according to a comparative example.

FIG. 7 is a schematic view illustrating a transition of charge management information according to a comparative example.

FIG. 8 is a schematic view illustrating a transition of charge management information according to a comparative example.

FIG. 9 is a schematic view illustrating a transition of charge management information according to Example.

FIG. 10 is a schematic view illustrating a transition of charge management information according to Example.

FIG. 11 is a schematic view illustrating a transition of charge management information according to Example.

FIG. 12 is a schematic view illustrating a transition of charge management information according to Example.

FIG. 16 is a schematic view illustrating usage history information when it is not normal and differs from that in FIG. 15.

FIG. 17 is a schematic view illustrating usage history information when it is not normal and differs from that in FIG. 16.

FIG. 18 is a schematic view illustrating usage history information when it is not normal and differs from that in FIG. 17.

DESCRIPTION OF EXEMPLARY EMBODIMENTS

Figure 1:
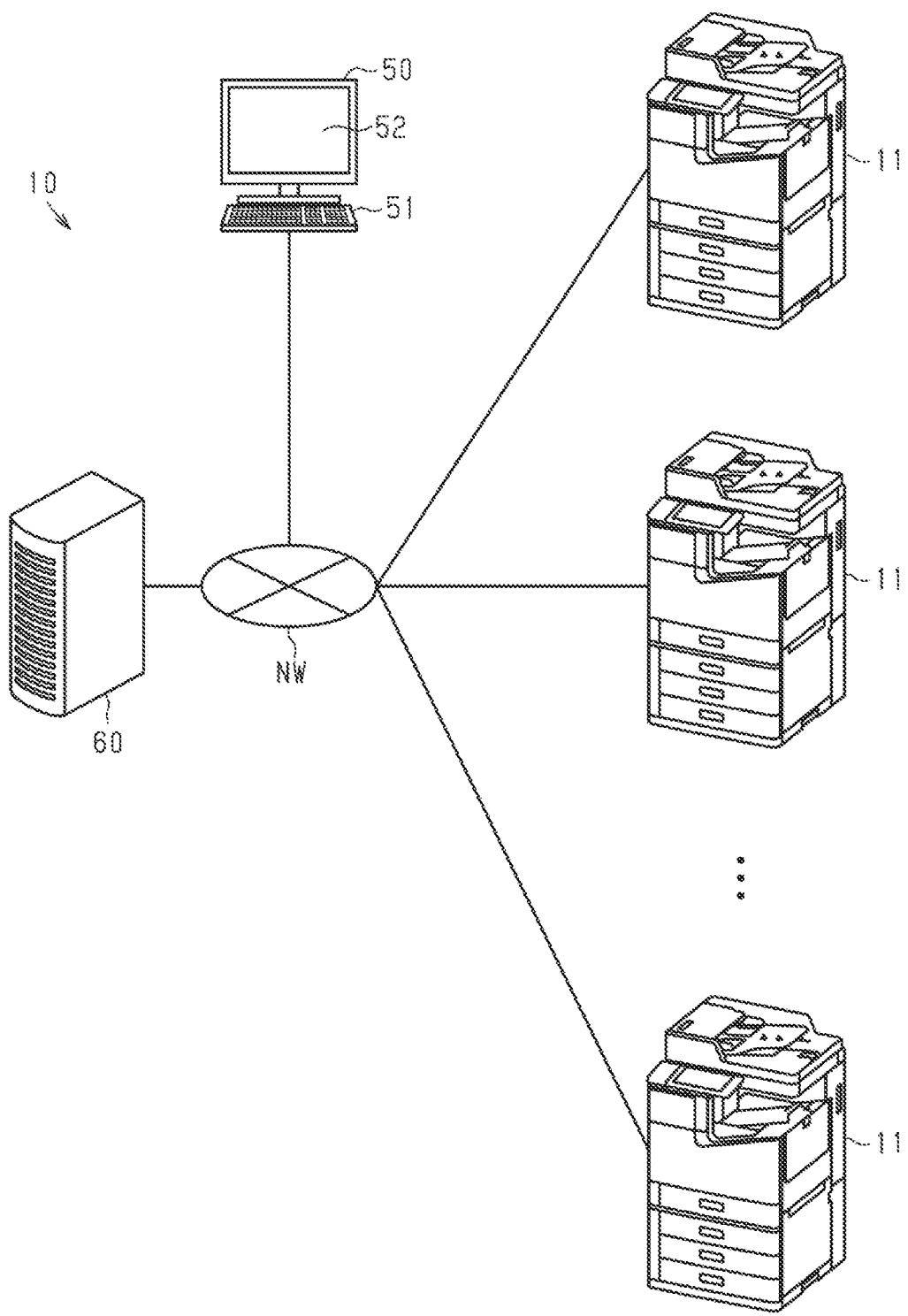
FIG. 1 is a schematic view illustrating a charging system according to an embodiment.

Below, an embodiment of a liquid ejecting device and a method of controlling a liquid ejecting device will be described with reference to the drawings. FIG. 1 illustrates a charging system in which charging is performed in accordance with the amount of use of a liquid ejecting device 11. As illustrated in FIG. 1, a charging system 10 includes a plurality of liquid ejecting devices 11, an information terminal 50 of an agency, and a server device 60. The liquid ejecting device is an ink jet-type printer, for example, configured to eject ink serving as one example of a liquid to a medium such as a sheet to perform printing.

In the present embodiment, the charging system 10 is configured to be able to manage the amount of consumption of a liquid such as ink used in the liquid ejecting device 11 and the number of printed sheets. The charging system 10 performs charging in accordance with the number of printed sheets on which printing is performed in the liquid ejecting device 11. The liquid ejecting device 11, the information terminal 50, and the server device 60 are coupled to each other so as to be able to communicate with each other through a network NW such as the Internet. The liquid ejecting device 11 may be coupled to the network NW through a host device (not illustrated) comprised, for example, of a personal computer or the like. The server device 60 is managed by a manufacture of or a dealer company of the liquid ejecting device 11. Note that FIG. 1 illustrates an example in which charging is performed separately for each of liquid ejecting devices 11.

A plurality of information terminals 50 are coupled to the network NW, and the number of the information terminals 50 is equal to or more than the number of agencies. Only one information terminal 50 is illustrated in FIG. 1 for the purpose of convenience of explanation. An agency provides a customer with a plurality of liquid ejecting devices 11. The liquid ejecting device 11 ejects a liquid such as ink to a medium M (see FIG. 2) such as a sheet to perform printing on the medium M. The agency charges a fee in accordance with the number of printed sheets for each of a plurality of ranges divided on the basis of the liquid consumption amount per sheet, and a unit price set for each of the ranges of the liquid consumption amount. For each predetermined period, the agency claims a fee charged for printing in the predetermined period.

The liquid ejecting device 11 stores charge management information CD (see FIG. 2) used to manage the number of printed sheets for each of the plurality of ranges of the liquid consumption amount.

The information terminal 50 includes an input unit 51 and a display unit 52. A staff member of the agency operates the information terminal 50 to issue an invoice or the like that specifies the fee charged on the basis of the charge management information CD (see FIG. 4) stored in the liquid ejecting device 11. In addition, a staff member of the agency is able to change the charge management information CD by operating the input unit 51 of the information terminal 50. Authentication using the server device 60 is required for the agency to access the liquid ejecting device 11 from the information terminal 50. Note that details of charging conditions used to determine a fee to be charged will be described later.

Upon receiving a request to access a predetermined liquid ejecting device 11 from the information terminal 50, the server device 60 performs authentication of the information terminal 50 by using an ID and a password inputted from the information terminal 50. When the information terminal 50 is successfully authenticated, the server device 60 permits the information terminal 50 to access the predetermined liquid ejecting device 11. The agency is able to access, from the information terminal 50, the liquid ejecting device 11 that has been leased to a user who is a lessee, to change charge management information CD stored in the liquid ejecting device 11. For example, the agent resets the number of printed sheets in the charge management information CD every time the agent finishes claiming the fee charged in a predetermined period from the information terminal 50 to the customer. Then, after the reset, the liquid ejecting device 11 starts to count the number of printed sheets for the next predetermined period.

Configuration of Liquid Ejecting Device 11

Figures 3, 4:
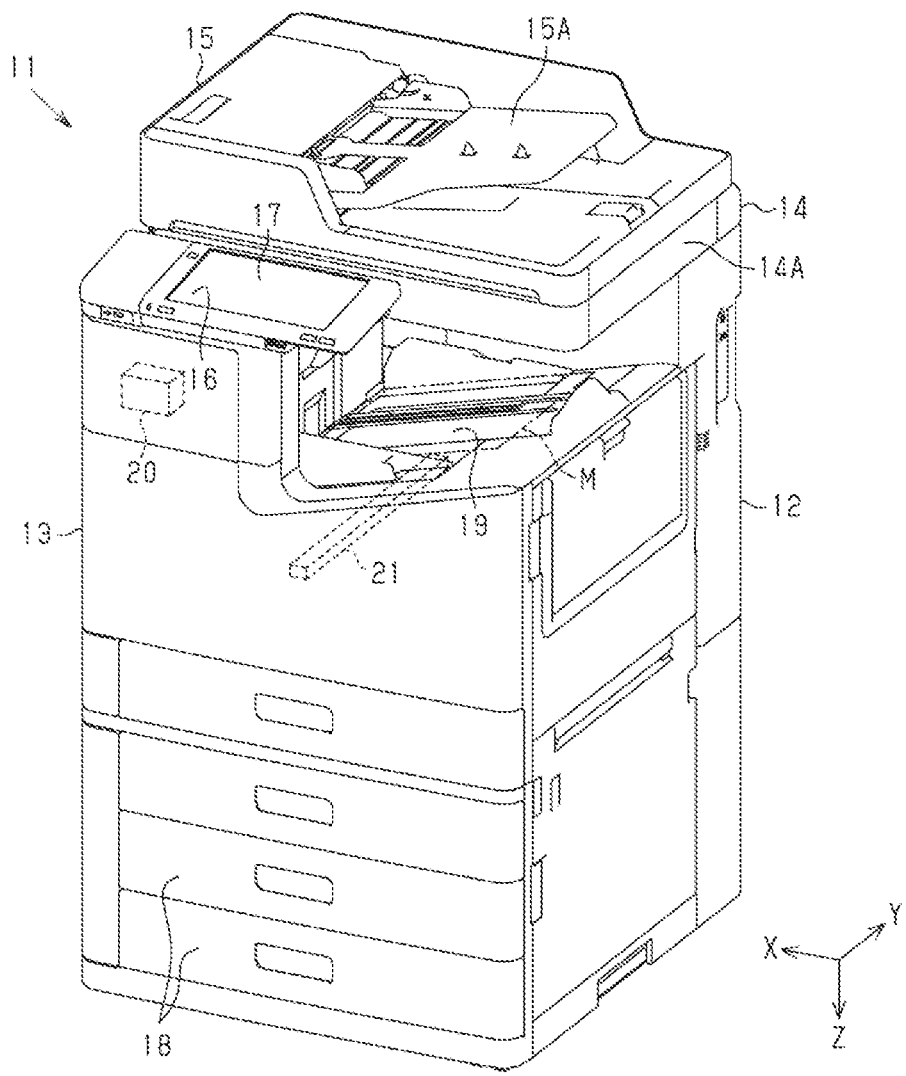
FIG. 3 is a perspective view illustrating a liquid ejecting device.
FIG. 4 is a schematic view illustrating a charge management information stored in a storage unit.

Next, the configurations of the liquid ejecting device 11 will be described in detail with reference to FIG. 3. In FIG. 3, the Z-axis indicates the direction of gravity on the assumption that the liquid ejecting device 11 is placed on the horizontal surface, and the X-axis and the Y-axis indicate directions along the horizontal surface. The X-axis, the Y-axis, and the Z-axis are perpendicular to each other. In FIG. 3, the width direction X indicates a direction that is parallel to the X-axis, the depth direction Y indicates a direction that is parallel to the Y-axis, and the vertical direction Z indicates a direction that is parallel to the Z-axis.

As illustrated in FIG. 3, the liquid ejecting device 11 includes a main body portion 12 having a cuboid shape. The liquid ejecting device 11 includes a printing unit 13 configured to extend over almost the entire main body portion 12, and an image reading unit 14 disposed at an upper side of the printing unit 13. The image reading unit 14 is configured to read an image of an original document (not illustrated). The liquid ejecting device 11 includes an automatic original-document feeding unit 15 used to transport the original document.

The liquid ejecting device 11 according to the present example is, for example, a multifunction device. The liquid ejecting device 11 has a scanner function of reading an original document, a copy function of performing copy printing of the original document, and a printing function of performing printing of a letter or an image on the basis of print data PD (see FIG. 2) sent from a host device 40 (see FIG. 2). Note that the liquid ejecting device 11 may have a facsimile function in a case of a multifunction device.

Furthermore, the liquid ejecting device 11 includes an input unit 16 and a display unit 17. By operating the input unit 16, a user can give an instruction to the liquid ejecting device 11. The display unit 17 may be configured, for example, with a touch panel. In this case, the input unit 16 may be configured with an operation function of the touch panel. Note that the input unit 16 may be configured with a mechanical switch.

The automatic original-document feeding unit 15 is configured to feed an original document placed at an original document tray 15A. The image reading unit 14 has a feed-type reading function of reading an original document fed from the automatic original-document feeding unit 15 and a flat-head-type reading function of reading an original document set at an original-document bench 14A.

As illustrated in FIG. 3, the liquid ejecting device 11 includes a liquid ejecting head 21 configured to eject a liquid to a medium M to perform printing, and a control unit 20 configured to control the liquid ejecting head 21. The control unit 20 includes a storage unit 31 (see FIG. 2).

The liquid ejecting head 21 constitutes a portion of the printing unit 13. The printing unit 13 includes: a medium accommodating unit 18 such as a cassette having a multiple stages and configured to accommodate a medium M such as a sheet; a transport unit 22 (see FIG. 2) configured to transport, one by one, the medium M accommodated in the medium accommodating unit 18; and a discharging tray 19 configured to discharge the medium M on which printing has been performed by the liquid ejecting head 21.

The control unit 20 manages the number of printed sheets in each range of the liquid consumption amount per sheet in printing performed by ejecting a liquid to the medium M from the liquid ejecting head 21. In this example, the liquid is, for example, ink. That is, the control unit 20 manages the number of printed sheets in each range of the liquid consumption amount per sheet in printing performed by ejecting ink from the liquid ejecting head 21. The liquid consumption amount per sheet is categorized into a plurality of regions and is managed. In this example, the liquid consumption amount per sheet is categorized into three regions of Low, Mid, and High. The control unit 20 manages the number of printed sheets for each region corresponding to a region to which the liquid consumption amount per sheet belongs in printing performed by ejecting a liquid from the liquid ejecting head 21 to the medium M.

Electrical Configuration of Charging System

Next, the electrical configuration of the charging system 10 will be described with reference to FIG. 2.

The liquid ejecting device 11 includes the control unit 20, the input unit 16, the display unit 17, the image reading unit 14, and the printing unit 13. The printing unit 13 includes the liquid ejecting head 21, the transport unit 22, and a maintenance unit 23. The maintenance unit 23 includes a pump 24. In addition, the liquid ejecting device 11 includes a communicating unit 25. The control unit 20 is coupled to the network NW through the communicating unit 25.

The control unit 20 includes a computer 30. The computer 30 is configured, for example, with a microprocessor. The computer 30 includes a liquid-consumption-amount measurement unit 32, a counter 33, a generating unit 34, and a storage unit 31. A program PR and the charge management information CD are stored in the storage unit 31. In addition to controlling the liquid ejecting device 11, the computer 30 manages the charge management information CD.

The computer 30 in the control unit 20 executes the program PR stored in the storage unit 31. The program PR includes a program for a charge MANAGEMENT PROCESSING shown as a flowchart in FIG. 13. The computer 30 executes the program for a charge MANAGEMENT PROCESSING to perform the charge management process. In this manner, the liquid ejecting device 11 manages information concerning a charge based on the charge management information CD stored in the storage unit 31.

Figure 2:
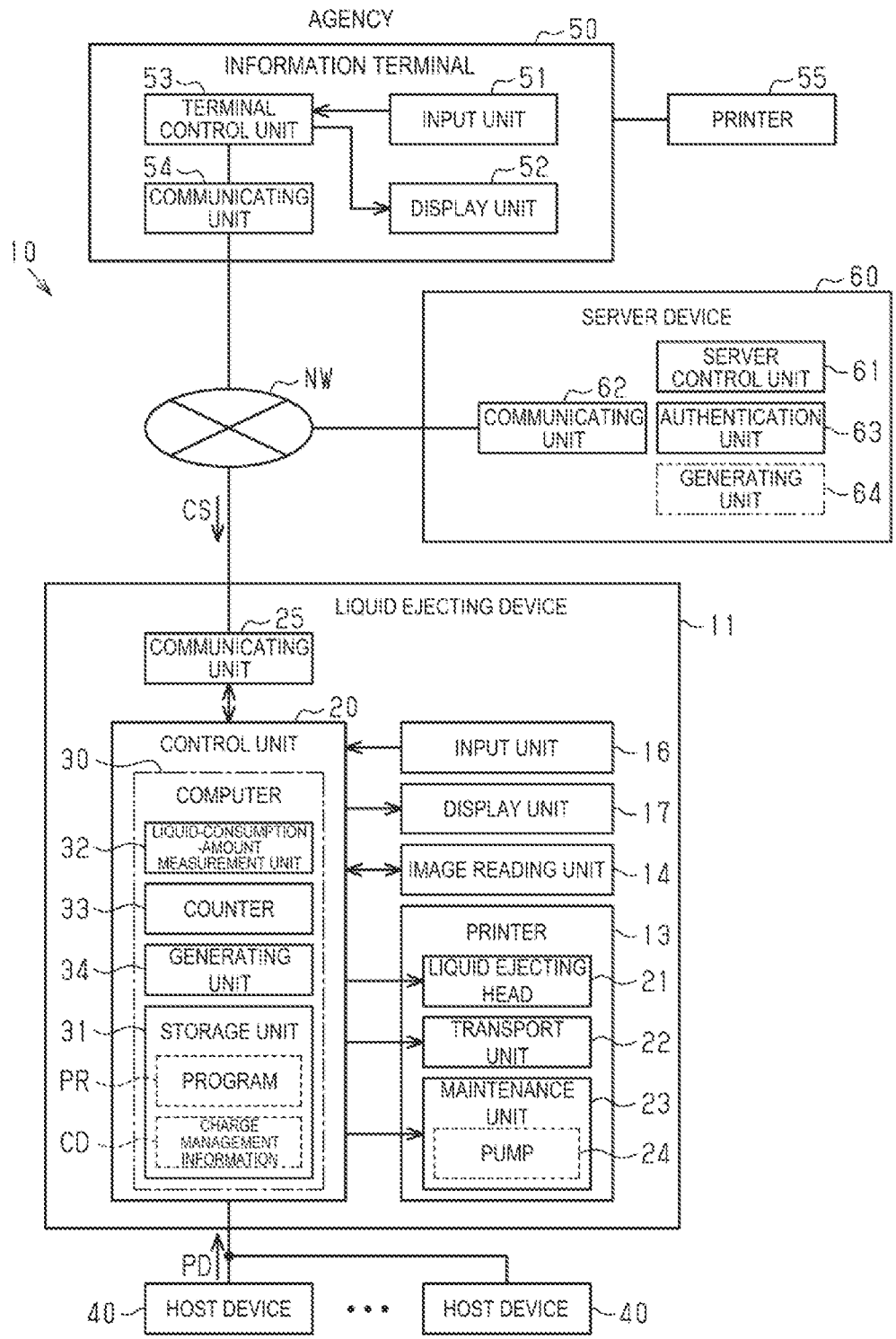
FIG. 2 is a block diagram illustrating a charging system.

As illustrated in FIG. 2, a plurality of host devices 40 are coupled to the liquid ejecting device 11 through a LAN such as an in-house local area network (in-house LAN). A user (for example, an employee) gives an instruction to perform printing, from a host device 40. At this time, print data PD is transmitted from the host device 40 to the liquid ejecting device 11. The print data PD are data including printing image data including a letter or an image serving as the target of printing, and also including printing condition information that a user designates. In the liquid ejecting device 11, upon print data PD being inputted from the host device 40, the control unit 20 controls the printing unit 13 to print, on a medium M, a letter or an image or the like based on the print data PD.

As illustrated in FIG. 2, the information terminal 50 at the agency includes the input unit 51, the display unit 52, a terminal control unit 53, and a communicating unit 54. The terminal control unit 53 comprehensively controls the information terminal 50. Furthermore, the terminal control unit 53 is coupled to the network NW through the communicating unit 54.

Furthermore, the server device 60 illustrated in FIG. 2 includes a server control unit 61, a communicating unit 62, and an authentication unit 63. The server control unit 61 comprehensively controls the server device 60. Furthermore, the server control unit 61 is coupled to the network NW through the communicating unit 54. The authentication unit 63 performs authentication at the time when the information terminal 50 of the agency accesses the liquid ejecting device 11. The agency inputs an ID and a password from the input unit 51 at the time of accessing the liquid ejecting device 11 from the information terminal 50. The authentication unit 63 performs authentication by using the ID and the password received from the information terminal 50. The server control unit 61 permits the information terminal 50 that has been successfully authenticated, to access the liquid ejecting device 11.

The control unit 20 of the liquid ejecting device 11 permits access to the charge management information CD from the information terminal 50 of the agency that has been successfully authenticated. In addition, from the information terminal 50 that is permitted to access, the agency is able to change the charge management information CD. The control unit 20 performs a process of changing the charge management information CD on the basis of an instruction from the information terminal 50. Note that the server device 60 may include a generating unit 64 having a function similar to that of the generating unit 34, in place of or in addition to the generating unit 34 included in the control unit 20 of the liquid ejecting device 11. The generating units 34 and 64 generate usage history information 70 (see FIG. 14 or the like) on the basis of the charge management information CD.

Next, the configuration of the liquid ejecting device 11 will be described in detail. By operating the input unit 16, a user selects one of printing, scanning, and copying from a menu screen of the display unit 17. In response to details of this selection, display contents at the display unit 17 switch from the menu screen to a setting screen (not illustrated) that allows for input of predetermined conditions such as a printing condition, a scanning condition, and a copying condition. In addition, by selecting a desired condition at the setting screen, the user gives the liquid ejecting device 11 an instruction to perform any one of printing, scanning, and copying. On the basis of the condition inputted by the user, the liquid ejecting device 11 performs any one of printing, scanning, and copying in accordance with the given instruction.

In addition, a staff member (hereinafter, referred to as an "agency" including a staff member) of the agency operates the input unit 16 to input an ID and a password. When being successfully authenticated, the agency is able to access the charge management information CD stored in the storage unit 31 of the liquid ejecting device 11. The agency accesses the charge management information CD to read out the number of printed sheets for each contracted predetermined period, or perform a reset operation concerning the number of printed sheets for each predetermined period, or perform a predetermined operation including changing the charge management information CD in association with a change of the contract details.

The image reading unit 14 is controlled by the control unit 20 to read an original document. In addition, the printing unit 13 is controlled by the control unit 20, and the liquid ejecting head 21 ejects a liquid droplet onto the medium M transported by the transport unit 22 to print a letter or an image or the like on the medium M. For example, when receiving an instruction to perform copying, the control unit 20 causes the image reading unit 14 to read an original document and also causes the printing unit 13 to print an image of the read original document on the medium M, thereby performing copying.

The maintenance unit 23 is controlled by the control unit 20, and maintains the liquid ejecting head 21 when it reaches a maintenance period. The maintenance includes flushing (no-load ejection) in which a liquid droplet is ejected to a predetermined location other than the medium M from all nozzles of the liquid ejecting head 21, and also includes cleaning in which a liquid is forcibly emitted from a nozzle of the liquid ejecting head 21. The maintenance unit 23 performs cleaning of the liquid ejecting head 21. The maintenance unit 23 includes a cap (not illustrated) configured to be able to move to a capping position where the cap is in contact with the nozzle surface at which a nozzle of the liquid ejecting head 21 is opened and also move to a retract position where the cap is spaced apart from the nozzle surface. In a state where the cap is in contact with the nozzle surface of the liquid ejecting head 21, the pump 24 is driven to cause the maintenance unit 23 to forcibly emit a liquid from a nozzle.

Note that the pump 24 is a suction pump that communicates with the cap, or a pressurizing pump that communicates with a nozzle of the liquid ejecting head 21 and pressurizes a liquid within a flow path from the upstream side. When the pump 24 is a suction pump, the nozzle surface and the cap form a closed space at the capping position where the cap is in contact with the nozzle surface, and the closed space communicates with the nozzle. When the pump 24 is driven in this state, the closed space that communicates with the nozzle is at a negative pressure, which causes a liquid to be forcibly emitted from the nozzle. Furthermore, when the pump 24 is a pressuring pump and the pump 24 is driven, the liquid within the flow path that communicates with the nozzle is pressurized from the upstream side, which causes the liquid to be forcibly emitted from the nozzle. At this time, the cap may be spaced slightly apart from the nozzle surface.

Here, the charge management information CD will be described with reference to FIG. 4. The charge management information CD is information used to manage the number of printed sheets for each of a plurality of ranges of the liquid consumption amount. As illustrated in FIG. 4, the storage unit 31 is able to store a plurality of ranges of the liquid consumption amount, and the number of printed sheets printed in a predetermined period for each of the plurality of ranges of the liquid consumption amount. In the present example, the liquid ejected by the liquid ejecting head 21 is ink, and hence, the liquid consumption amount is the ink consumption amount.

Here, the predetermined period represents a unit of charging period in accordance with the contract details. For example, when it is a monthly contract, charging is performed on a monthly basis. When charging is performed on a monthly basis, the number of printed sheets in the charge management information CD is reset every time the monthly charging ends. In addition, after the reset, charging for the next month starts. In this case, the predetermined period is a period of one month from a time when the number of printed sheets is reset for the purpose of previous claim. Note that the unit of charging period is not limited to one month, and may be a plurality of months, half a month, a unit of 10 days, or a unit of one week. In any case, the number of printed sheets in the charge management information CD is reset for every contracted period. Furthermore, the predetermined period represents a period until the contracted period has elapsed since the number of printed sheets in the charge management information CD was reset for the purpose of claiming the charged fee.

As illustrated in FIG. 4, the charge management information CD stored in the storage unit 31 includes a plurality of "regions" that are fee regions, a "range" used to define each of the regions, and the "number of printed sheets" for each range. In the example illustrated in FIG. 4, three "regions" of "Low", "Mid", and "High" are set as fee regions. The "range" is set for each "region" in accordance with the contract details. Thus, the agency is able to change the "range" in accordance with the contract details. FIG. 4 illustrates the charge management information CD at the time of contract.

In the example of the contract details illustrated in FIG. 4, the range "5.0% or less" is set for the low fee region of "Low". The range "5.1 to 10.1%" is set for the middle fee region of "Mid". Furthermore, the range "10.1% or higher" is set for the high fee region of "High". Here, the "range" indicates the liquid consumption amount per sheet. The liquid consumption amount per sheet is indicated as a relative value (%) of the liquid consumption amount when the expected maximum value or the reference value of the liquid consumption amount per sheet is set to 100%. Note that the "range" may be a weight or a volume of the liquid consumption amount per sheet.

FIG. 4 illustrates the charge management information CD in an initial state at the time of contract. Thus, the number of printed sheets is "zero" in all the three regions. In FIG. 4, the "fee per sheet" is shown in a region surrounded by the dashed line. In the example in FIG. 4, fees are set such that the fee per sheet in the low fee region "Low" is "5 yen", the fee per sheet in the middle fee region "Mid" is "10 yen", and the fee per sheet in the high fee region "High" is "20 yen". FIG. 4 shows the fees per sheet that are referred to at the time of calculating the charged amount. However, these fees per sheet are not stored in the storage unit 31. In other words, the fee per sheet is information contained in the charge management information CD. Note that the number of "regions" is not limited to three, and may be four or more or may be two.

Returning to FIG. 2, the control unit 20 causes the liquid-consumption-amount measurement unit 32 to measure the liquid consumption amount per sheet (ink consumption amount) on the basis of the print data PD. The liquid-consumption-amount measurement unit 32 measures the liquid consumption amount that is the amount of consumption of a liquid (ink) consumed during single printing. The liquid-consumption-amount measurement unit 32 also measures the liquid consumption amount that is the consumption of a liquid (ink) during maintenance. For example, the liquid-consumption-amount measurement unit 32 includes a plurality of color counters configured to count the number of liquid droplets for each ink color on the basis of printing image data for each color that constitute the print data PD. For example, the liquid ejecting head 21 may be configured such that, at the time of ejecting, liquid droplets are divided into a plurality of different dot sizes, thereby being able to form dots with a plurality of gray-scales. In this case, the color counter may be configured to count the number of dots for each of the dot sizes. The liquid-consumption-amount measurement unit 32 is configured to measure the liquid consumption amount per sheet by adding together the amounts of liquid droplets for each ink color that are counted by a plurality of color counters on the basis of printing image data for one sheet (one page) contained in the print data PD.

The counter 33 is configured to count the number of printed sheets. There are provided a plurality of counters 33 configured to count the number of printed sheets for each of the "regions" that are fee regions. The control unit 20 counts, by "1", the count value of a counter 33 corresponding to the target "region" from among the plurality of counters 33. The count value of each of the counters 33 indicates the number of printed sheets for each of the "regions" in the charge management information CD.

The charging system 10 according to the present embodiment includes the input unit 16 of the liquid ejecting device 11 provided as a way to change the "ranges" in the charge management information CD illustrated in FIG. 4, and also includes the input unit 51 of the information terminal 50 of the agency. As described above, the change of "ranges" can be made by the agency. By operating the input unit 16 of the liquid ejecting device 11, a staff member of the agency is able to access the charge management information CD stored in the storage unit 31 to change the "ranges". Furthermore, by operating the input unit 51 of the information terminal 50, the staff member of the agency is able to access the charge management information CD stored in the storage unit 31 of the liquid ejecting device 11 to change the "ranges".

The control unit 20 is able to receive, from each of the input units 16 and 51, an instruction to change the "ranges" in the charge management information CD. The agency is able to transmit, from the information terminal 50 to the liquid ejecting device 11, an instruction to change the "ranges" in the charge management information CD. Upon receiving the instruction to change the "ranges", the control unit 20 changes the value of the "range" in the charge management information CD into an instructed value.

When the "range" in the charge management information CD is changed, the control unit 20 changes the value of the number of printed sheets into a value differing from the number of printed sheets in the normal charge management information CD before the change. Specifically, when the plurality of ranges of the liquid consumption amount are changed within a predetermined period, the control unit 20 performs invalidation processing on the number of printed sheets stored in the storage unit 31. That is, the control unit 20 invalidates the number of printed sheets that is the previous value counted for each of the ranges of the liquid consumption amount on the basis of the range (range before the change) before the range is changed. Upon the "range" being changed, the control unit 20 according to the present embodiment resets the value of the number of printed sheets. In other words, the control unit 20 changes the value of the number of printed sheets to "0" to invalidate the value of the number of printed sheets until this time.

Figure 14:
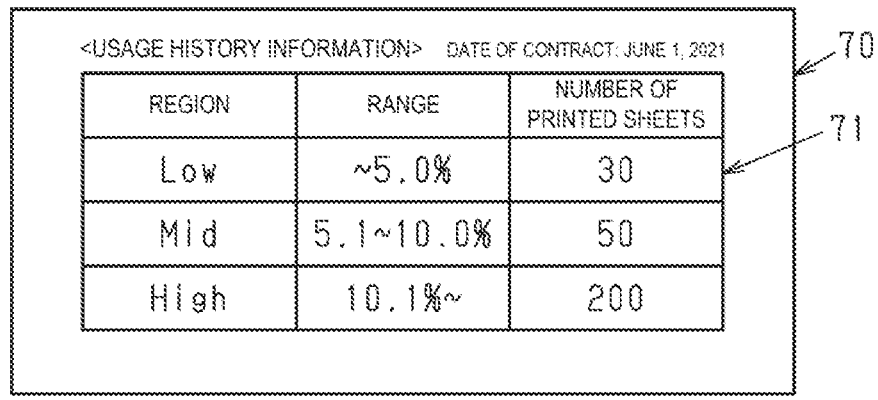
FIG. 14 is a schematic view illustrating normal usage history information outputted by a liquid ejecting device.

Furthermore, the control unit 20 is able to receive, from an external information terminal 50, an instruction CS to output usage history information 70 (see FIG. 14 or the like). Upon receiving the instruction CS, the control unit 20 causes the generating unit 34 to generate the usage history information 70 on the basis of the charge management information CD. Note that the control unit 20 is also able to receive, from the input unit 16 of the liquid ejecting device 11, an instruction to output the usage history information 70.

The liquid ejecting device 11 includes the printing unit 13 and the display unit 17 serving as one example of an output unit configured to output the usage history information 70. The printing unit 13 outputs the usage history information 70 through printing. In addition, the display unit 17 outputs the usage history information 70 through displaying. This enables the agency to show the usage history information 70 serving as details of charge performed to a customer. By viewing the usage history information 70, the customer is able to determine whether or not the charged amount is correct.

Next, description will be made of invalidation processing in which a customer does not suffer a disadvantage when the range is changed into a value differing from the contract details due to a certain reason. Below, a comparative example and Example will be described. The comparative example is an example of a configuration in which, even when the "range" in the charge management information CD is changed, the number of sheets printed before change is kept without any change. The Example is an example in which, when the "range" in the charge management information CD is changed, the invalidation processing is performed to the number of printed sheets before the change.

Process for Charge Management Information in Comparative Example

First, a process according to the comparative example performed to the charge management information CD will be described with reference to FIGS. 5 to 8. Note that, in each of the drawings, a fee per sheet is indicated for each of the three regions at the right side of the charge management information CD for the reference purpose. However, as in FIG. 4, the fee per sheet is not recorded in the storage unit 31. This similarly applies to the charge management information CD according to Example illustrated in FIGS. 9 to 12.

As illustrated in the comparative example in FIG. 5, it is assumed that the ranges in the charge management information CD are changed A-th day after the contract has been made, into a content differing from the contract details due to a certain error or the like such as noise. For example, the ranges for three fee regions are "5.0% or less", "5.1% to 10.0%", and "10.1% or higher", respectively, at the time of contract as illustrated in FIG. 4. It is assumed that these are changed A-th day after the contract has been made into "1.0% or less", "1.1% to 2.0%", and "2.1% or higher", as illustrated in FIG. 5. At this time, the number of printed sheet is "10" in only the region "Low", and the number of printed sheets is "0" in the other regions.

In the comparative example in FIG. 6, the number of printed sheets is counted on the basis of a wrong range that has been changed due to a certain reason during a period until B days before the due date for the fee payment. In the example in FIG. 6, the number of printed sheets is counted such that the number of printed sheets is "30" in the region "Low", is "50" in the region "Mid", and is "200" in the region "High". Here, for example, when the liquid consumption amount per sheet is "3%", the number of sheets counted falls in the region "Low" on the basis of the contract details. However, on the basis of the wrong "range" shown in FIG. 6, the number of sheets counted falls in the region "High". In other words, the number of printed sheets is counted and is placed into a "region" of a higher fee, rather than the "region" where the number should be placed into in accordance with the contract details. When finding any error of the "range" within the predetermined period, the agency corrects the wrong "range" to be the "range" according to the contract details.

As illustrated in the comparative example in FIG. 7, correction is made B days before the fee is paid, from the wrong "range" illustrated in FIG. 6 to be returned to the "range" according to the contract details illustrated in FIG. 7. As illustrated in FIG. 7, even if the range is returned to the contract details, the number of printed sheets remains unchanged. In other words, the number of printed sheets is not corrected, and is left as the number of printed sheets in the region at the higher unit price side.

As illustrated in FIG. 8, the fee claimed at the time of fee payment is calculated on the basis of the number of printed sheets that includes the number of printed sheets that has been added to the region at the higher unit price side in a period of time from A-th day after the contract has been made to B days before the fee is paid. Thus, the customer is claimed for a fee higher than the contract details.

Here, when the liquid consumption amount per sheet can be stored in the storage unit 31 throughout the entire printing, it is possible to, in response to a change of the range, categorize the number of printed sheets again in accordance with the changed range. However, in many cases, for example, a huge number of sheets in a range of several thousand to several tens of thousands may be printed in a predetermined period. For such a huge number of printed sheets, it is difficult to store the liquid consumption amount per sheet because this significantly reduces the storage capacity of the storage unit 31 that can be used for storage and processing of the print data PD. For this reason, the storage unit 31 only stores the plurality of "regions", the "range" of the liquid consumption amount for each of the regions, and the "number of printed sheets" for each of the regions.

Invalidation processing for Charge Management Information in Example

Next, a process according to Example performed to the charge management information CD will be described with reference to FIGS. 9 to 12. The control unit 20 according to the present example performs invalidation processing when a range in the charge management information CD changes. Below, this invalidation processing will be described.

When the plurality of ranges of the liquid consumption amount are changed within a predetermined period, the control unit 20 performs invalidation processing to reset the number of printed sheets stored in the storage unit 31. The value of the reset number of printed sheets is, for example, "0". However, the reset value is not limited to "0", and may be, for example, "1". Here, "reset" represents a process of returning it to the default value of the invalidating process.

As shown in Example in FIG. 9, it is assumed that the "range" in the charge management information CD is changed A-th day after the contract has been made, so as to differ from the contract details for a certain reason such as an error resulting from noise or the like. For example, at the time of contract, the "ranges" of three "regions" are set as "5.0% or less", "5.1% to 10.0%", "10.1% or higher", respectively, as shown in FIG. 4. It is assumed that these ranges are changed A-th day after the contract has been made, into "1.0% or less", "1.1% to 2.0%", and "2.1% or higher", as illustrated in FIG. 9. At this time, the number of printed sheets in each of the three regions is reset, and all the numbers are set to "0".

In Example in FIG. 10, the number of printed sheets is counted in accordance with a wrong range that has been changed for a certain reason during a period until B days before the fee is paid. In the example in FIG. 10, the number of sheets are counted to be "20" in the region "Low", be "50" in the region "Mid", and be "200" in the region "High". Here, for example, when the liquid consumption amount per sheet is "3%", the number of printed sheets should be counted in the range "Low" in accordance with the contract details. However, when counting is performed in accordance with the wrong "range" illustrated in FIG. 10, the number of printed sheets is counted in the region "High". In other words, the number of printed sheets is counted and is placed into a "region" of a higher fee, rather than the "region" where the number should be placed into in accordance with the contract details. When finding any error of the "range" within the predetermined period, the agency corrects the wrong "range" to be the "range" according to the contract details.

As illustrated in Example in FIG. 11, correction is performed B days before the fee is paid, so as to get the wrong "range" illustrated in FIG. 10 back to the "range" according to the contract details illustrated in FIG. 11. As illustrated in FIG. 11, when the "range" is got back to the range according to the contract details, the number of printed sheets is reset. In other words, the invalidation processing is performed to the number of printed sheets counted into the wrong region in a period from A-th day after the contract has been made to B days before the fee is paid.

As illustrated in FIG. 12, the fee claimed at the time of fee payment is calculated on the basis of the number of printed sheets that does not contain the number of printed sheets added to the "region" of a higher unit price side in a period from A-th day after the contract has been made to B days before the fee is paid. Thus, the customer is not claimed for the fee higher than that based on the contract details, and does not suffer an unexpected disadvantage.

Next, the usage history information 70 will be described with reference to FIGS. 14 to 18.

In response to an instruction CS from the outside, the control unit 20 is able to output the usage history information 70 including the plurality of ranges of the liquid consumption amount and the number of printed sheets on which, in a predetermined period, printing is performed in each of the plurality of ranges of the liquid consumption amount. The instruction CS from the outside includes, for example, an instruction from an information terminal 50 of the agency.

When the plurality of ranges of the liquid consumption amount are changed within a predetermined period, the control unit 20 outputs usage history information (see FIG. 15 or the like) differing from normal usage history information 70 (see FIG. 14) outputted at the time of when no change is made.

FIG. 14 shows normal usage history information 70 in which the plurality of ranges of the liquid consumption amount are not changed within the predetermined period. As illustrated in FIG. 14, when the plurality of ranges of the liquid consumption amount are not changed within the predetermined period, the control unit 20 outputs the normal usage history information 70. The normal usage history information 70 includes information 71 indicating: a plurality of "regions"; "ranges" at the time of contract; and the "number of printed sheets" during a period of time until the predetermined period at this time has elapses since the number of printed sheets were reset at the previous fee payment time (at the time when the fee was claimed).

The usage history information 70 illustrated in FIGS. 15 to 18 is usage history information 70 when the plurality of ranges of the liquid consumption amount are changed within a predetermined period. When the plurality of ranges of the liquid consumption amount are changed within the predetermined period, the control unit 20 outputs usage history information 70 including information in which the plurality of ranges of the liquid consumption amount are changed.

Here, the "information in which the plurality of ranges of the liquid consumption amount are changed" included in the usage history information 70 represents information with which a customer can identify that change has been made. The usage history information 70 illustrated in FIG. 15 includes information 72 indicating the "region", the "range", and the "number of printed sheets", and also includes a message 73 "'range' has been changed during a predetermined period".

Figures 16, 17:
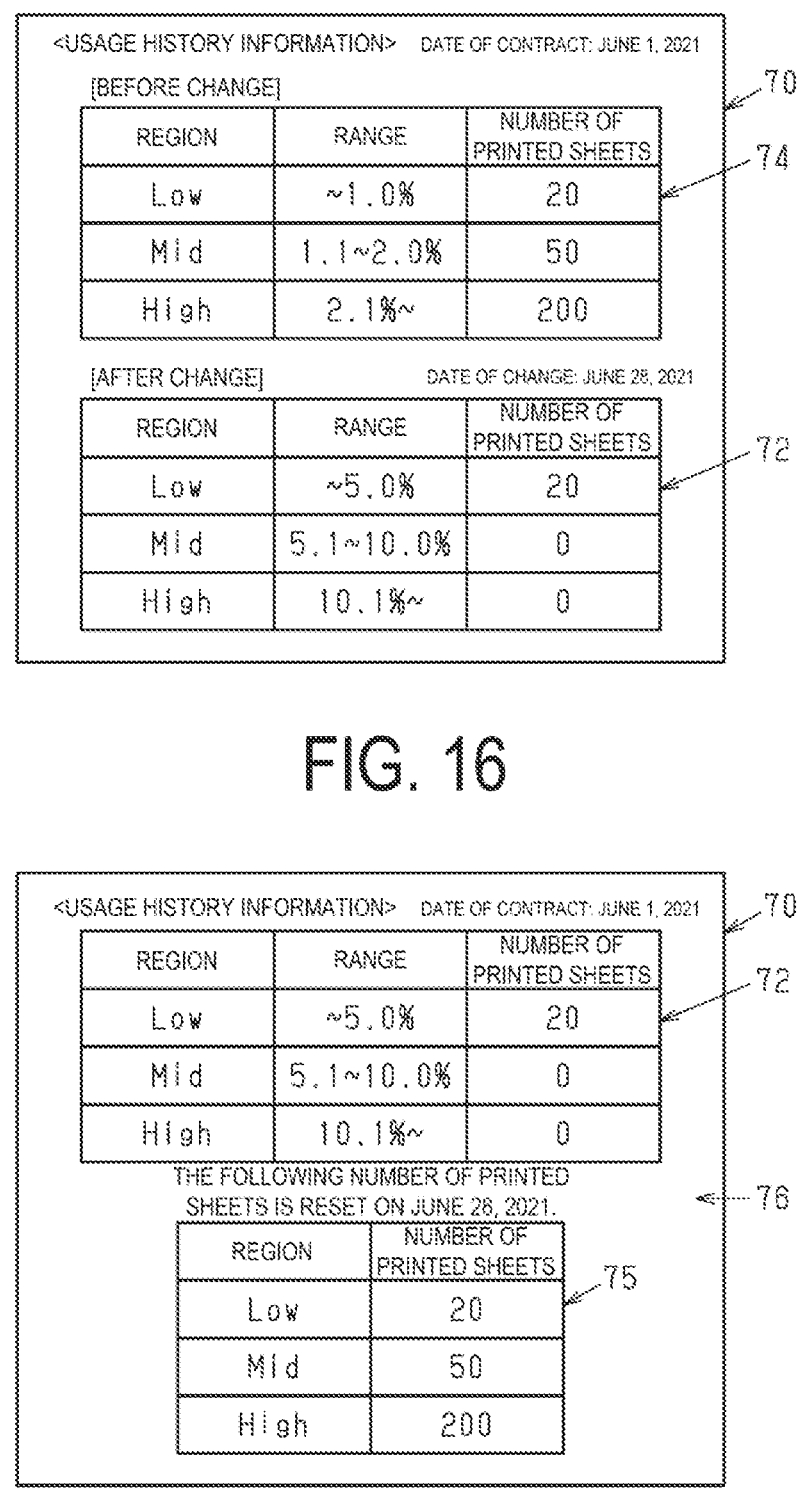

As illustrated in FIG. 16, when the plurality of ranges of the liquid consumption amount are changed within the predetermined period, the control unit 20 outputs the usage history information 70 including the information 72 concerning the plurality of ranges of the liquid consumption amount after change. Here, the information 72 concerning the plurality of ranges of the liquid consumption amount after change and included in the usage history information 70 is, for example, information 72 concerning the charge management information CD after change illustrated in FIG. 16. The example illustrated in FIG. 16 indicates the usage history information 70 outputted at the time of fee payment. Thus, the information 72 concerning the range after change accords with the contract details. For this reason, only by looking at the information 72 concerning the range after change, it is difficult to determine whether or not the range has been changed within the predetermined period. For example, in the usage history information 70 outputted after the range has been changed from the range according to the contract details during the predetermined period, the ranges after change are "1.0% or less", "1.1 to 2.0%", and "2.1% or higher", which differ from those according to the contract details. In this case, by looking at this usage history information 70, a user can identify that the range has been changed within the predetermined period.

In the example illustrated in FIG. 16, the usage history information 70 includes both information 74 concerning a range before change, and the information 72 concerning the range after change. Thus, a customer who looks at the usage history information 70 can identify that the range has been changed during a predetermined period from a time when reset was performed in the previous time to the present time. In particular, as illustrated in FIG. 16, the usage history information 70 includes the range after change as well as the date when the change was made. Thus, the customer can easily find that the range has been changed.

As illustrated in FIG. 16, when the plurality of ranges of the liquid consumption amount are changed within the predetermined period, the control unit 20 outputs the usage history information 70 including the information 74 concerning the plurality of ranges of the liquid consumption amount before change. Here, the usage history information 70 includes the information 74 concerning the plurality of ranges of the liquid consumption amount before change. In the example illustrated in FIG. 16, although the information 72 and the information 74 include information concerning the "region" and the "number of printed sheets", these pieces of information may include only the information about the "range", for example.

As illustrated in FIG. 17, when the plurality of ranges of the liquid consumption amount are changed within the predetermined period, the control unit 20 outputs the usage history information 70 including information 75 about the number of printed sheets on which the invalidation processing has been performed. The usage history information 70 includes the information 75 about the number of printed sheets on which the invalidation processing has been performed. The usage history information 70 illustrated in FIG. 17 includes the information 72 concerning the plurality of ranges of the liquid consumption amount after change, and the information 75 about the number of printed sheets that has been reset.

As illustrated in FIG. 18, when the plurality of ranges of the liquid consumption amount are changed within the predetermined period, the control unit 20 outputs the usage history information 70 including pieces of information 72, 74, and 77 about the history of change concerning the plurality of ranges of the liquid consumption amount. The usage history information 70 may include information 72, 74, 77 about the history of change. In the example illustrated in FIG. 18, the usage history information 70 includes the information 77 concerning the charge management information CD before the first change, the information 74 concerning the charge management information CD before the second change, and the information 72 concerning the charge management information CD after the second change.

Figure 13:
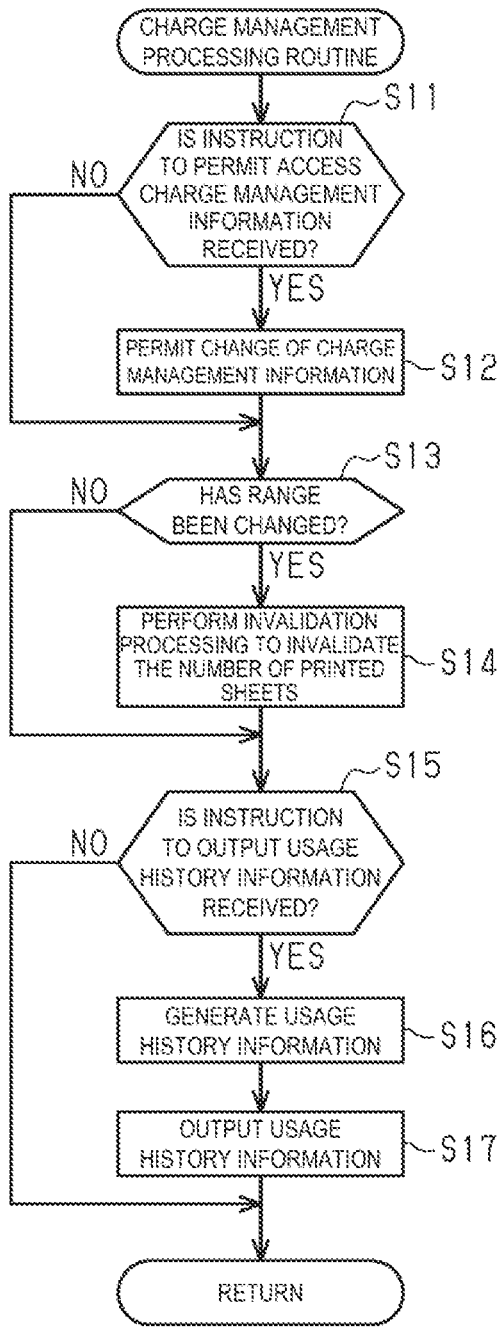
FIG. 13 is a flowchart showing a charge MANAGEMENT PROCESSING routine.

In the present embodiment, of the program PR, the computer 30 executes a program for a charge MANAGEMENT PROCESSING illustrated in FIG. 13 to perform a charge management process. This charge MANAGEMENT PROCESSING achieves a method of controlling the liquid ejecting device 11. This control method includes the following two steps. That is, the control method provides a method of controlling the liquid ejecting device 11 including the liquid ejecting head 21 configured to eject a liquid to the medium M to perform printing, the liquid ejecting device 11 being configured to be able to store the plurality of ranges of the liquid consumption amount and the number of printed sheets on which, in a predetermined period, printing is performed in each of the plurality of ranges of the liquid consumption amount. In addition, this control method includes the following two steps.

(a) Determining whether or not the plurality of ranges of the liquid consumption amount are changed within the predetermined period.

(b) Performing the invalidation processing on the stored number of printed sheets when the plurality of ranges of the liquid consumption amount are changed within the predetermined period.

Effect of Embodiment

Next, operation of the charging system 10 and the liquid ejecting device 11 according to the embodiment will be described. Below, description will be made of a charge MANAGEMENT PROCESSING performed by the computer 30 of the control unit 20 that constitutes the liquid ejecting device 11. During the power supply being turned on, the computer 30 performs a charge MANAGEMENT PROCESSING routine illustrated in FIG. 13. Note that the "range" in the charge management information CD may be changed due to a certain reason such as an error resulting from an error or the like. Here, in addition to an error resulting from noise, this certain reason includes, for example, an incorrect action of rewriting data made by a person having a right to access the charge management information CD, and a computer virus.

When the "range" in the charge management information CD is rewritten due to a certain reason as described above, the computer 30 performs the invalidation processing on the value of the number of printed sheets. Specifically, the computer 30 determines whether or not the range at the time of contract matches the range in the charge management information CD. When these ranges match, the computer 30 maintains the value of the number of printed sheets without any process. When these ranges do not match, the computer 30 performs the invalidation processing on the number of printed sheets. In the present Example, resetting is used as the invalidating process. Furthermore, the agency accesses, from the information terminal 50, the charge management information CD stored in the storage unit 31 by the liquid ejecting device 11. Upon finding that the range has been changed into a value differing from the contract details for a certain reason, the agency changes (corrects) the wrong range so as to get it back to the contract details.

Below, with reference to FIG. 13, description will be made of a charge MANAGEMENT PROCESSING performed by the computer 30 when the range in the charge management information CD is changed for a certain reason and when an agency changes the range changed for a certain reason so as to get it back to the contract details.

First, in step S11, the computer 30 determines whether or not an instruction to permit access to the charge management information CD is received. When the instruction is received, the computer 30 moves to step S12. When the instruction is not received, the computer 30 moves to step S13.

For example, when an instruction to permit access is not received, the computer 30 advances from a process in step S11 to a process in step S13. For example, as shown in comparative example in FIG. 5, it is assumed that the range in the charge management information CD is changed A-th day after the contract has been made, so as to differ from the contract details. For example, as illustrated in FIG. 4, the ranges of the three regions are "5.0% or less", "5.1% to 10.0%", and "10.1% or higher" at the time of contract. It is assumed that, as illustrated in FIG. 9, these are changed A-th day after the contract has been made, into "1.0% or less", "1.1% to 2.0%", and "2.1% or higher".

In step S13, the computer 30 determines whether or not the range is changed. When the range is not changed, the computer 30 moves to step S15. When the range is changed, the computer 30 moves to step S14. Note that the process in step S13 corresponds to one example of "determining whether or not the plurality of ranges of the liquid consumption amount are changed within a predetermined period".

In step S14, the computer 30 performs the invalidation processing on the number of printed sheets. In this case, as illustrated in FIG. 9, when the "ranges" in the charge management information CD are changed, the computer 30 resets the number of printed sheets. In other words, by setting the number of printed sheets to "0", the computer 30 invalidates the value of the number of sheets printed until then.

After the ranges are changed, the number of printed sheets is counted for each of the changed ranges. For example, there may be a case where printing is counted and is placed into the "High" in accordance with the changed ranges, rather than into the "Low" where printing should be counted into in accordance with the contract details. For example, when the liquid consumption amount per sheet is "3%", the number of printed sheets is counted into the region "Low" in accordance with the contract details illustrated in FIG. 4. However, after the range is changed A-th day after the contract has been made, the "3%" of the liquid consumption amount per sheet belongs to the range "2.1% or higher" corresponding to the region "High", and hence, the number of printed sheets is counted as the region "High". This results in a fact that the fee per sheet is counted into the region of "20 yen", rather than into the region of "5 yen" where the fee per sheet should be counted into.

In addition, in Example in FIG. 10, the number of printed sheets is counted wrongly in accordance with the range that has been changed for a certain reason during a period until B days before the fee is paid. For example, when the number of printed sheets is counted wrongly as described above and the "ranges" are stated in an invoice for fee payment, the "ranges" differ from the contract details, and thus, a user (customer) who reads this invoice is able to point out that the charged amount is not correct.

However, when accessing the charge management information CD from the information terminal 50, the agency may find an abnormality that the ranges in the charge management information CD differ from the contract details. In this case, the agency corrects the wrong "ranges" in the charge management information CD to get them back to those according to the contract details using a remote operation from the information terminal 50. At this time, the information terminal 50 of the agency inputs an ID and a password. The server device 60 performs an authentication process on the basis of the ID and the password. Once the information terminal 50 is successfully authenticated, the server device 60 outputs, to the liquid ejecting device 11, an instruction to permit access to the charge management information CD. The computer 30 of the liquid ejecting device 11 performs the following process in a manner shown in FIG. 13.

In step S11, the computer 30 determines whether or not the instruction to permit access to the charge management information is received. When the instruction is received, the computer 30 moves to step S12.

In step S12, the computer 30 permits a change of the charge management information. The agency accesses the charge management information CD from the information terminal 50, and corrects if any abnormality exists in the charge management information CD. For example, when the "ranges" in the charge management information CD are changed to differ from the contract details for a certain reason, correction is performed to get the "ranges" back to those according to the contract details from the information terminal 50.

In step S13, the computer 30 determines whether or not the ranges are changed. When the ranges are changed, the computer 30 moves to step S14. When the ranges are not changed, the computer 30 moves to step S15.

Furthermore, in step S14, the computer 30 performs the invalidation processing on the number of printed sheets. In this case, when the ranges are changed B days before the fee is paid so as to get them back to those according to the contract details as illustrated in FIG. 11, the number of printed sheets is reset. In other words, by setting the number of printed sheets to "0", the value of the number of sheets printed until then is invalidated. Note that the process in step S14 corresponds to one example of "when the plurality of ranges of the liquid consumption amount are changed within the predetermined period, the invalidation processing is performed to the stored number of printed sheets".

For example, as indicated in Example in FIG. 11, correction is performed B days before the fee is paid, so as to get the wrong "ranges" illustrated in FIG. 10 back to the "ranges" according to the contract details illustrated in FIG. 11. In this case, as illustrated in FIG. 11, reset is performed to the number of printed sheets that includes the number of printed sheets added to the "region" at the higher unit price side during a period from A-th day after the contract has been made to B days before the fee is paid. Thus, as illustrated in FIG. 12, the fee claimed at the time of fee payment is calculated on the basis of the number of printed sheets counted during a period from B days before the fee payment to a time when the fee is paid. For this reason, the customer is charged the fee lower than the contract details. That is, it is possible to avoid a situation where the customer suffers an unexpected disadvantage in which the fee higher than the contract details is claimed.

Furthermore, by operating the information terminal 50, the agency accesses the liquid ejecting device 11, thereby being able to cause it to output the usage history information 70. By operating the information terminal 50, an instruction to output the usage history information 70 is transmitted to the liquid ejecting device 11.

In step S15, the computer 30 determines whether or not the instruction to output the usage history information 70 is received. When the instruction to output the usage history information 70 is received, the computer 30 moves to step S16. When this instruction is not received, the computer 30 ends this routine.

In step S16, the computer 30 generates the usage history information 70. Specifically, the computer 30 causes the generating unit 34 to generate the usage history information 70. The generating unit 34 generates the usage history information 70 on the basis of the charge management information CD. When the ranges are not changed within the predetermined period, the generating unit 34 generates, for example, the normal usage history information 70 illustrated in FIG. 14. On the other hand, when the ranges are changed within the predetermined period, the generating unit 34 generates, for example, the usage history information 70 as illustrated in FIGS. 15 to 18, which differs from the normal usage history information 70 illustrated in FIG. 14. If the ranges are changed within the predetermined period, the invalidation processing is performed to the number of printed sheets when the ranges (for example, FIG. 15) differ from normal ranges (FIG. 14) or when the ranges are changed. Thus, the number of printed sheets (for example, FIG. 15) differs from the normal number of printed sheets (FIG. 14). Thus, the usage history information 70 when the ranges are changed within the predetermined period differs from the normal usage history information 70 in terms of at least the number of printed sheets from among the ranges and the number of printed sheets.

In step S17, the computer 30 outputs the usage history information 70. That is, the computer 30 outputs the usage history information 70 generated by the generating unit 34. Here, output of the usage history information 70 may be performed through printing by the printing unit 13 or may be performed through displaying by the display unit 17. Furthermore, the computer 30 may output the usage history information 70 to the information terminal 50 of the agency through the communicating unit 25. In this case, the terminal control unit 53 of the information terminal 50 may cause the display unit 52 to display the usage history information 70 or may cause the printer 55 to print out the usage history information 70.

Figure 15:
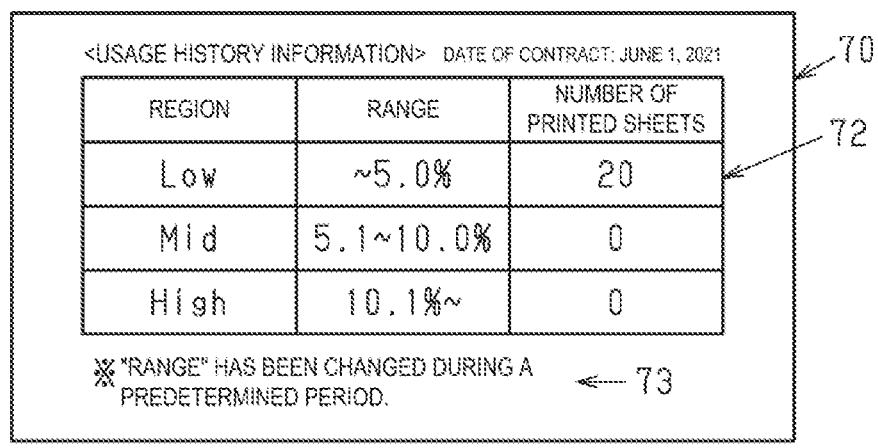
FIG. 15 is a schematic view illustrating usage history information outputted by a liquid ejecting device when it is not normal.

In the usage history information 70 illustrated in FIG. 15, the number of printed sheets is "20" in the region "Low", and "0" in both of "Mid" and "High". Furthermore, the usage history information 70 includes a message 73 indicating that the "range" has been changed during the predetermined period as illustrated in FIG. 15. By looking at details of the usage history information 70, the customer can know that the ranges have been changed within the predetermined period, on the basis of the message 73 and the number of printed sheets that has been reset once during the predetermined period.

In addition, the usage history information 70 illustrated in FIG. 16 includes information 72 concerning the plurality of ranges of the liquid consumption amount after change. Furthermore, this usage history information 70 also includes the information 74 concerning the plurality of ranges of the liquid consumption amount before change. Specifically, the usage history information 70 illustrated in FIG. 16 includes the information 72 concerning the charge management information after change and the information 74 concerning the charge management information before change. Thus, by looking at the usage history information 70, the customer can know that the ranges are changed within the predetermined period. In addition, in the usage history information 70 outputted at the time of payment, the ranges before change differ from the contract details as illustrated in FIG. 16. Thus, by looking at the usage history information 70, the customer can know that the ranges are changed within the predetermined period.

In addition, the usage history information 70 illustrated in FIG. 17 includes the information 75 concerning the number of printed sheets on which the invalidation processing has been performed. Specifically, in addition to the information 72 concerning the charge management information after change, the usage history information 70 includes the information 75 concerning the number of printed sheets that has been reset and serving as information about the number of printed sheets on which the invalidation processing has been performed, as illustrated in FIG. 17. Furthermore, this usage history information 70 includes a message 76 serving as information indicating that there is the number of printed sheets on which the invalidation processing has been performed. Thus, by looking at the usage history information 70, the customer can know that the ranges are changed within the predetermined period.

Furthermore, the usage history information 70 illustrated in FIG. 18 includes information 72, 74, and 77 about the history of change. As illustrated in FIG. 18, the usage history information 70 includes the information 77 concerning the charge management information CD before the first change, the information 74 concerning the charge management information CD before the second change, and the information 72 concerning the charge management information CD after the second change. Thus, on the basis of the information 72, 74, and 77 about the history of change of the usage history information 70, the customer can know that the ranges have been changed within the predetermined period.

Below, effects of the present embodiment will be described.

(1) The liquid ejecting device 11 includes the liquid ejecting head 21 configured to eject a liquid to the medium M to perform printing, and the control unit 20 configured to control the liquid ejecting head 21 and include the storage unit 31. The storage unit 31 is configured to be able to store a plurality of ranges of the liquid consumption amount, and the number of printed sheets on which, in the predetermined period, printing is performed in each of the plurality of ranges of the liquid consumption amount. When the plurality of ranges of the liquid consumption amount are changed within the predetermined period, the control unit 20 is configured to perform invalidation processing on the number of printed sheets stored in the storage unit 31. With this configuration, it is possible to suppress occurrence of a disadvantage to a user (customer) even when a charge setting changes from the contract details due to an unexpected event.

(2) When the plurality of ranges of the liquid consumption amount are changed within the predetermined period, the control unit 20 is configured to reset, as the invalidation processing, the number of printed sheets stored in the storage unit 31. With this configuration, even when the charge setting changes from the contract details due to an unexpected event, a user easily recognizes that the change of setting happens. This makes it possible to suppress occurrence of a disadvantage to the user.

(3) In response to an instruction CS from the outside, the control unit 20 is configured to be able to output the usage history information 70 including: the plurality of ranges of the liquid consumption amount; and the number of printed sheets on which, in the predetermined period, printing is performed in each of the plurality of ranges of the liquid consumption amount. When the plurality of ranges of the liquid consumption amount are changed within the predetermined period, the control unit 20 is configured to output the usage history information 70 differing from normal usage history information 70 outputted when no change is made. With this configuration, even when the charge setting changes from the contract details due to an unexpected event, a user can easily know this change. This makes it possible to suppress occurrence of a disadvantage to the user.

(4) When the plurality of ranges of the liquid consumption amount are changed within the predetermined period, the control unit 20 is configured to output the usage history information 70 including information (for example, the message 73) indicating that the plurality of ranges of the liquid consumption amount are changed. With this configuration, even when the charge setting changes from the contract details due to an unexpected event, a user easily recognizes that the change of setting happens. This makes it possible to suppress occurrence of a disadvantage to the user.

(5) When the plurality of ranges of the liquid consumption amount are changed within the predetermined period, the control unit 20 is configured to output the usage history information 70 including the information 72 concerning a plurality of ranges of the liquid consumption amount after change. With this configuration, even when the charge setting changes from the contract details due to an unexpected event, the usage history information 70 including the information 72 concerning the plurality of ranges of the liquid consumption amount after change is outputted. Thus, a user can easily recognize that the change of setting happens. This makes it possible to suppress occurrence of a disadvantage to the user.

(6) When the plurality of ranges of the liquid consumption amount are changed within the predetermined period, the control unit 20 is configured to output the usage history information 70 including the information 74 concerning the plurality of ranges of the liquid consumption amount before change. With this configuration, even when the setting changes from the contract details due to an unexpected event, the usage history information 70 including the information 72 and 74 concerning the plurality of ranges of the liquid consumption amount before and after change is outputted, which enables a user to easily recognize that the change of setting happens. This makes it possible to suppress occurrence of a disadvantage to the user.

(7) When the plurality of ranges of the liquid consumption amount are changed within the predetermined period, the control unit 20 is configured to output the usage history information 70 including information about the number of printed sheets on which the invalidation processing is performed. With this configuration, even when the charge setting changes from the contract details due to an unexpected event, a user can easily recognize that the change of setting happens. This makes it possible to suppress occurrence of a disadvantage to the user.

(8) Provided is a method of controlling the liquid ejecting device 11 including the liquid ejecting head 21 and configured to be able to store a plurality of ranges of the liquid consumption amount and the number of printed sheets on which, in a predetermined period, printing is performed in each of the plurality of ranges of the liquid consumption amount. This control method includes the following two steps (a) and (b).

(a) Determining whether or not the plurality of ranges of the liquid consumption amount are changed within the predetermined period.

(b) Performing the invalidation processing on the stored number of printed sheets when the plurality of ranges of the liquid consumption amount are changed within the predetermined period.

With this control method, even when the charge setting changes from the contract details due to an unexpected event, it is possible to suppress occurrence of a disadvantage to a user.

Note that the embodiment described above may be modified into modes such as modification examples described below. Furthermore, it may be possible to combine the embodiment described above and the modification examples described below on an as-necessary basis to obtain another modification example. In addition, it may be possible to combine modification examples described below on an as-necessary basis to obtain another modification example.

When the invalidation processing is a process to reset the number of printed sheets for each of a plurality of ranges in the usage history information, the reset value is not limited to "0". For example, the reset value may be a value such as "1" that is lower than the number of printed sheets or may be a letter, a character, an error display, or the like other than a number. In addition, as the invalidation processing, the display of the number of printed sheets itself may be eliminated.

The invalidation processing is not limited to the resetting process. For example, the invalidation processing may be a process in which the value of the number of printed sheets in each of the plurality of ranges is changed into the minimum value of the numbers of printed sheets in a plurality of individual ranges. In other words, if the original numbers of printed sheets are used without any change, there is a possibility that a user (customer) suffers a disadvantage due to an unexpected event. Thus, the invalidation processing is only necessary to be a process in which the charged fee is reduced to be less than the fee charged when the original numbers of printed sheets are used without any change. That is, the invalidation processing is not limited to resetting to a value of "0", "1", or the like. The invalidation processing may be a process of changing the number of printed sheets into a value greater than these reset values, provided that the value falls within a range that does not cause the user to suffer a disadvantage. In this respect, the invalidation processing may be, for example, a process of uniformly changing the number of printed sheets in each of the plurality of ranges into a value of ½, ⅓, ¼, or the like.

The invalidation processing may be a process of resetting the ranges (for example, High and Mid ranges), at the side with a higher fee per sheet, of the plurality of ranges, and maintaining the number of printed sheets in the range (for example, Low) at the lower fee side without any change.

When the ranges are changed, the control unit 20 may determine whether or not this change causes a disadvantage to a user, and on the basis of a result of the determination, determine whether or not to perform the invalidating process. For example, when the change of the range results in an increase in the fee charged to a user to be higher than before, the control unit 20 performs the invalidating process. When the change of the range results in a reduction in the fee charged to the user to be lower than before, the control unit 20 does not perform the invalidating process. With this configuration, the user does not suffer any disadvantage due to an unexpected event, and it is possible to reduce the amount of loss to the agency side due to the change of ranges.

It may be possible to employ a configuration in which the amount of consumption of a liquid consumed during maintenance is not included in the liquid consumption amount used to determine the number of printed sheets in each of the plurality of ranges. For example, it may be possible to employ a configuration in which the liquid consumption amount resulting from flushing (no-load ejection) is included but the liquid consumption amount resulting from maintenance is not included, or it may be possible to employ a configuration in which neither the liquid consumption amount resulting from flushing nor the liquid consumption amount resulting from maintenance are not included.

In a case of employing invalidation other than resetting, when the agency changes the ranges by operating the information terminal 50, it may be possible to employ a configuration in which either one of invalidation of and reset of the number of printed sheets can be selected. In this case, when the monthly fee claim for the predetermined period ends, and both change of ranges and reset of the number of printed sheets need to be performed from the next month, resetting is selected to change the ranges. When the ranges are changed in the middle of the predetermined period, it is possible to perform invalidation of the number of printed sheets, rather than performing resetting.

In the embodiment described above, when the charge management information changes due to an unexpected event, the invalidation processing is performed to the number of printed sheets. In contrast, it may be possible to employ a configuration in which, when the charge management information changes due to an unexpected event, the invalidation processing is not performed, and when the agency or the like erroneously operates the information terminal 50 from the outside to change the charge management information CD in the storage unit 31, the invalidation processing is performed to the number of printed sheets.

The number of the plurality of ranges is not limited to three. One or two other ranges may be added to the three ranges used to define the three regions Low, Mid, and High, thereby setting four or five ranges. In addition, the number of ranges may be six or more. Furthermore, the number of ranges may be two so as to correspond to two regions of Low and High.

The charge management information CD may include information concerning a fee per sheet.

The charge management information CD may not include a region. For example, the charge management information CD may be information comprised only of a plurality of ranges and the number of printed sheets for each of the ranges.

The medium M is not limited to the sheet, and may include a film or sheet made of synthetic resin, cloth, nonwoven cloth, a composite film (laminate sheet) made of synthetic resin and metal, a metal foil, a ceramic sheet, or the like.

The liquid ejecting device 11 is not limited to the ink jet type printer, and may be an ink jet type textile printing device. Furthermore, the liquid ejecting device 11 is not limited to the line printer, and may be a serial printer or a page printer.

The liquid that the liquid ejecting head 21 ejects is not limited to the ink, and may be, for example, a liquid-like body in which particles made of functional material are dispersed or mixed in a liquid. For example, the the liquid ejecting head 21 may eject a liquid-like body including a material such as an electrode material or a pixel material used in manufacture of liquid crystal display, an electroluminescent display, and a surface emitting display in a dispersed or dissolved form. Furthermore, the solvent or disperse medium of a liquid is not limited to water, and may be an organic solvent. The medium may be a substrate.

Below, technical concepts acquired from the embodiment described above and the modification examples are described together with the effects.

(A) A liquid ejecting device includes a liquid ejecting head configured to eject a liquid to a medium to perform printing, and a control unit configured to control the liquid ejecting head and include a storage unit, in which the storage unit is configured to be able to store a plurality of ranges of a liquid consumption amount, and the number of printed sheets on which, in a predetermined period, printing is performed in each of the plurality of ranges of the liquid consumption amount, and when the plurality of ranges of the liquid consumption amount are changed within the predetermined period, the control unit performs invalidation processing on the number of printed sheets stored in the storage unit.

With this configuration, even when the contract details concerning charging change due to an unexpected event, it is possible to suppress occurrence of a disadvantage to a user.

(B) In the liquid ejecting device described above, when the plurality of ranges of the liquid consumption amount are changed within the predetermined period, the control unit may be configured to reset, as the invalidation processing, the number of printed sheets stored in the storage unit.

With this configuration, even when the charge setting changes from the contract details due to an unexpected event, a user can easily recognize that the change of setting happens. This makes it possible to suppress occurrence of a disadvantage to the user.

(C) In the liquid ejecting device, in response to an instruction from an outside, the control unit is configured to be able to output usage history information including the plurality of ranges of the liquid consumption amount and the number of printed sheets on which, in the predetermined period, printing is performed in each of the plurality of ranges of the liquid consumption amount, and when the plurality of ranges of the liquid consumption amount are changed within the predetermined period, the control unit may be configured to output usage history information differing from normal usage history information outputted when no change is made.

With this configuration, even when the charge setting changes from the contract details due to an unexpected event, a user can easily know this change. This makes it possible to suppress occurrence of a disadvantage to the user.

(D) In the liquid ejecting device, when the plurality of ranges of the liquid consumption amount are changed within the predetermined period, the control unit may be configured to output the usage history information including information indicating that the plurality of ranges of the liquid consumption amount are changed.

With this configuration, even when the charge setting changes from the contract details due to an unexpected event, a user can easily recognize that the change of setting happens. This makes it possible to suppress occurrence of a disadvantage to the user.

(E) In the liquid ejecting device, when the plurality of ranges of the liquid consumption amount are changed within the predetermined period, the control unit may be configured to output the usage history information including information concerning the plurality of ranges of the liquid consumption amount after change.

With this configuration, even when the charge setting changes from the contract details due to an unexpected event, the usage history information including information concerning the plurality of ranges of the liquid consumption amount after change is outputted. Thus, a user can easily recognize that the change of setting happens. This makes it possible to suppress occurrence of a disadvantage to the user.

(F) In the liquid ejecting device, when the plurality of ranges of the liquid consumption amount are changed within the predetermined period, the control unit may be configured to output the usage history information including information concerning the plurality of ranges of the liquid consumption amount before change.

With this configuration, even when the setting changes from the contract details due to an unexpected event, the usage history information including information concerning the plurality of ranges of the liquid consumption amount before and after the change is outputted. Thus, a user can easily recognize that the change of setting happens. This makes it possible to suppress occurrence of a disadvantage to the user.

(G) In the liquid ejecting device, when the plurality of ranges of the liquid consumption amount are changed within the predetermined period, the control unit may be configured to output the usage history information including information concerning the number of printed sheets on which the invalidation processing is performed.

With this configuration, even when the charge setting changes from the contract details due to an unexpected event, a user can easily recognize that the change of setting happens. This makes it possible to suppress occurrence of a disadvantage to the user.

(H) Provided is a method of controlling a liquid ejecting device including a liquid ejecting head configured to eject a liquid to a medium to perform printing, the liquid ejecting device being configured to be able to store a plurality of ranges of a liquid consumption amount and the number of printed sheets on which, in a predetermined period, printing is performed in each of the plurality of ranges of the liquid consumption amount, the method including: determining whether or not the plurality of ranges of the liquid consumption amount are changed within the predetermined period; and when the plurality of ranges of the liquid consumption amount are changed within the predetermined period, performing invalidation processing on the stored number of the printed sheets.

With this method, even when the charge setting changes from the contract details due to an unexpected event, it is possible to suppress occurrence of a disadvantage to a user.

What is claimed is:

1. A liquid ejecting device comprising:
   a liquid ejecting head configured to eject a liquid to a medium to perform printing; and
   a control unit configured to control the liquid ejecting head and include a storage unit, wherein
   the storage unit is configured to store a plurality of ranges of a liquid consumption amount, and a number of printed sheets on which, in a predetermined period, printing is performed in each of the plurality of ranges of the liquid consumption amount, and
   when the plurality of ranges of the liquid consumption amount are changed within the predetermined period, the control unit performs invalidation processing on the number of the printed sheets stored in the storage unit.

2. The liquid ejecting device according to claim 1, wherein,
   when the plurality of ranges of the liquid consumption amount are changed within the predetermined period, the control unit resets, as the invalidation processing, the number of the printed sheets stored in the storage unit.

3. The liquid ejecting device according to claim 1, wherein
   in response to an instruction from an outside, the control unit is configured to output usage history information including the plurality of ranges of the liquid consumption amount and the number of the printed sheets on which, in the predetermined period, printing is performed in each of the plurality of ranges of the liquid consumption amount, and
   when the plurality of ranges of the liquid consumption amount are changed within the predetermined period, the control unit is configured to output usage history information differing from normal usage history information outputted when no change is made.

4. The liquid ejecting device according to claim 3, wherein,
   when the plurality of ranges of the liquid consumption amount are changed within the predetermined period, the control unit is configured to output the usage history information including information indicating that the plurality of ranges of the liquid consumption amount are changed.

5. The liquid ejecting device according to claim 3, wherein,
   when the plurality of ranges of the liquid consumption amount are changed within the predetermined period, the control unit is configured to output the usage history information including information concerning the plurality of ranges of the liquid consumption amount after the change.

6. The liquid ejecting device according to claim 5, wherein,
   when the plurality of ranges of the liquid consumption amount are changed within the predetermined period, the control unit is configured to output the usage history information including information concerning the plurality of ranges of the liquid consumption amount before the change.

7. The liquid ejecting device according to claim 3, wherein,
   when the plurality of ranges of the liquid consumption amount are changed within the predetermined period, the control unit is configured to output the usage history information including information concerning the number of the printed sheets on which the invalidation processing is performed.

8. A method of controlling a liquid ejecting device including a liquid ejecting head configured to eject a liquid to a medium to perform printing, the liquid ejecting device being configured to store a plurality of ranges of a liquid consumption amount and a number of printed sheets on which, in a predetermined period, printing is performed in each of the plurality of ranges of the liquid consumption amount, the method comprising:
- determining whether or not the plurality of ranges of the liquid consumption amount are changed within the predetermined period; and
- when the plurality of ranges of the liquid consumption amount are changed within the predetermined period, performing invalidation processing on the stored number of the printed sheets.

\* \* \* \* \*